Patented Nov. 25, 1941

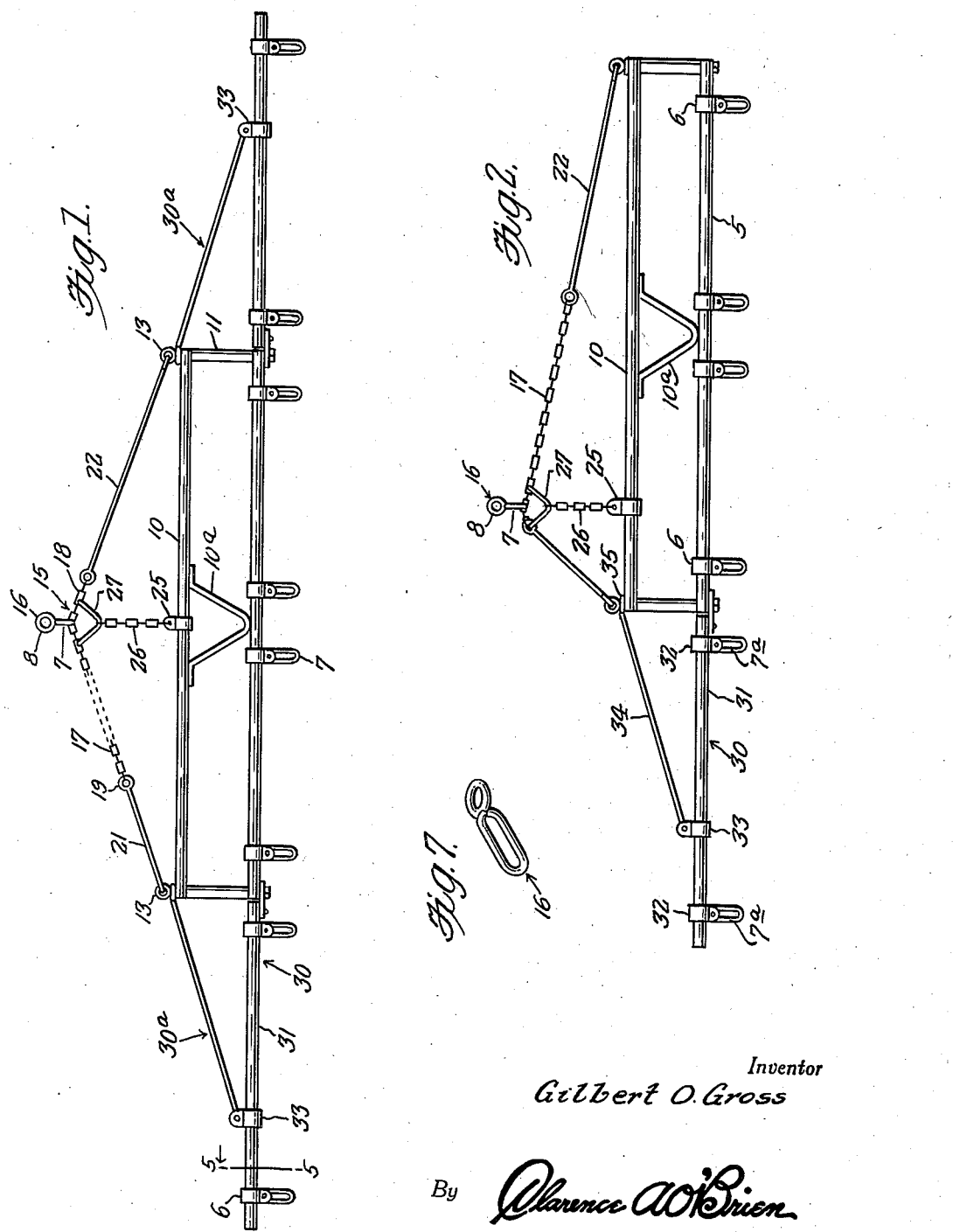

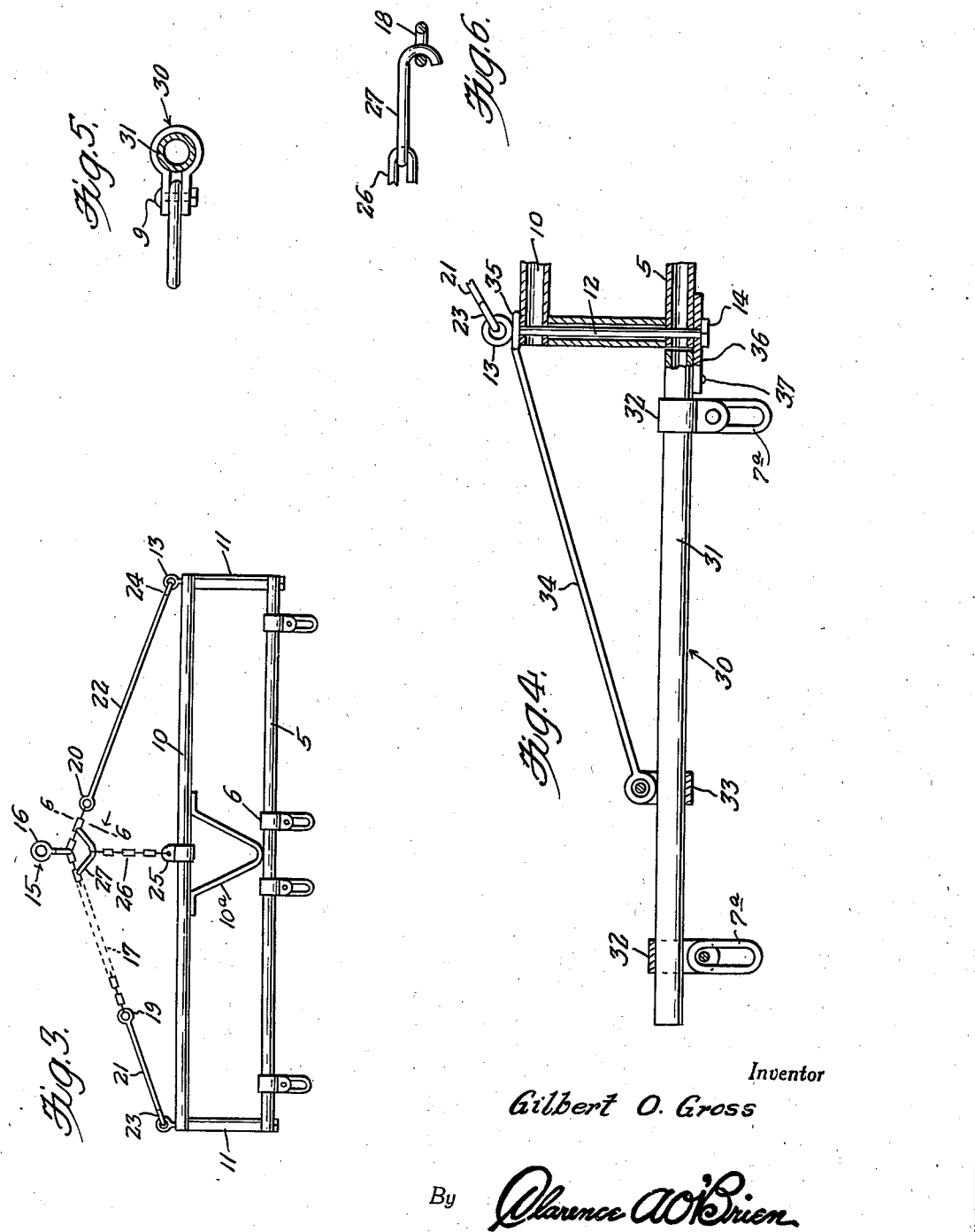

2,263,968

UNITED STATES PATENT OFFICE 2,263,968

HARROW DRAWBAR

Gilbert O. Gross, Greenfield, Iowa

Application April 6, 1940, Serial No. 328,285

1 Claim. (Cl. 55—84)

This invention appertains to new and useful improvements in draw bars for harrows, and more particularly to a draw bar which can be folded conveniently with the principal objects in mind of permitting the harrow to be moved through narrow spaces or collapsed for the purpose of storage in limited space.

Another important object of the invention is to provide a harrow draw bar of the character stated which can be readily adjusted to meet various requirements.

Other objects and advantages of the invention will become apparent to the reader of the following specification.

In the drawings:

Figure 1 represents a top plan view of a complete draw bar,

Figure 2 is a top plan view of the draw bar modified to three sections,

Figure 3 is a top plan view of a harrow draw bar modified to two sections,

Figure 4 is an enlarged fragmentary top plan view of one end of the harrow draw bar shown in Figure 1 with parts in section, Figure 5 is a section on the line 5—5 of Figure 1, Figure 6 is a section on the line 6—6 of Figure 3, Figure 7 is a perspective view of one of the coupling links.

Referring to the drawings wherein like numerals designate like parts it can be seen in Figure 3, that numeral 5 denotes a bar provided with clamps 6 having agricultural implement attaching links 7 secured in place by bolts 9.

As shown in Figure 4, a second bar is provided and is held in spaced relation from the first bar 5 by spacers 11, 11 which are interposed between the ends of the bars 5 and 10 and through which eye-bolts 12 are disposed. Each eye-bolt is equipped with an eye 13 at one end and a nut 14 at its opposite end.

Numeral 15 denotes a hitch for the draw bar and this consists of a double eye member 16. A pair of rods 21 and 22 are provided forwardly of the bar 10 and have eyes 23 and 24, respectively, linked with the eyes 13 and the bolts 12 (see Figure 4). The remaining ends of the rods 21 and 22 are provided with eyes 19 and 20, respectively, it being observed that the rod 20 is shorter than the rod 22. The eyes 19 and 20 are connected by a chain 17 and this chain 17 is in turn connected to one eye of the double eye member 16.

A clamp 25 is secured to the intermediate portion of the bar 10 and is connected by the chain 26 to the V-shaped member 27 which has end hooks engaged with the chain 17 at opposite sides of the double eye member 16.

A V-shaped brace 10a is interposed between the intermediate portion of the bars 5 and 10.

The foregoing makes up a two-section harrow draw bar.

To accommodate an additional section, the draw bar is modified as shown in Figure 2, by shifting the clamp 25 to the left and connecting the V-shaped hook member 27 to the chain at a point closer to the short rod 21. An extension 30 is provided on this end of the bar 5 and this extension consists of a bar 31 having clamps 32—32 thereon for accommodating links or clevises 7a. A clamp 33 is provided at the intermediate portion of the bar 31 and a brace rod 34 extends therefrom to the adjacent bolt 12, this brace rod 34 having an eye 35 at its inner end through which the adjacent bolt 12 extends, as clearly shown in Figure 4. A strap member 36 has one end secured to the inner end of the section 31 as at 37 while its other end is formed with an opening for receiving the nut engaging end of the adjacent bolt 12.

When both wing sections 30a and 30a are employed as shown in Figure 1, the hitch 15 is moved back to a central portion as in the case of the two harrow section draw bar disclosed in Figure 3.

Obviously, the wing sections 30a can be removed at will, or swung upon the intermediate section for the purpose of permitting storage in a small space or to permit the harrow and draw bar to pass through a narrow space.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A draw bar for sectional harrows comprising a pair of connected parallel spaced bars, one of said bars provided with harrow attaching means thereon, a slide member on the other bar, a short rod loosely connected at one end to one end of the last-mentioned bar, a longer rod loosely connected at one end to the remaining end of the same bar, an elongated flexible element connecting the remaining ends of the rods, a hook adjustably engaged with the elongated flexible element, a connection between the hook and the slide member, and a swingably connected wing member at the short rod end of the draw bar, and harrow attaching means on the wing member.

GILBERT O. GROSS.